(12) United States Patent
Stappenbeck

(10) Patent No.: US 11,080,370 B2
(45) Date of Patent: *Aug. 3, 2021

(54) METHODS AND SYSTEMS FOR PROCESSING CONTENT RIGHTS

(71) Applicant: COMCAST CABLE COMMUNICATIONS MANAGEMENT, LLC, Philadelphia, PA (US)

(72) Inventor: Alfred J. Stappenbeck, Seattle, WA (US)

(73) Assignee: COMCAST CABLE COMMUNICATIONS MANAGEMENT, LLC, Philadelphia, PA (US)

(*) Notice: Subject to any disclaimer, the term of this patent is extended or adjusted under 35 U.S.C. 154(b) by 96 days.

This patent is subject to a terminal disclaimer.

(21) Appl. No.: 16/272,886

(22) Filed: Feb. 11, 2019

(65) Prior Publication Data

US 2019/0278888 A1 Sep. 12, 2019

Related U.S. Application Data

(63) Continuation of application No. 14/859,939, filed on Sep. 21, 2015, now Pat. No. 10,248,768, which is a continuation of application No. 13/671,139, filed on Nov. 7, 2012, now Pat. No. 9,177,158.

(51) Int. Cl.
| | |
|---|---|
| *G06F 21/10* | (2013.01) |
| *G06F 21/60* | (2013.01) |
| *G06F 21/62* | (2013.01) |

(52) U.S. Cl.
CPC ............ *G06F 21/105* (2013.01); *G06F 21/10* (2013.01); *G06F 21/602* (2013.01); *G06F 21/6218* (2013.01)

(58) Field of Classification Search
CPC .... G06F 21/105; G06F 21/6218; G06F 21/10; G06F 21/602
See application file for complete search history.

(56) References Cited

U.S. PATENT DOCUMENTS

| | | | | |
|---|---|---|---|---|
| 7,748,030 | B1* | 6/2010 | Selberg | ............................. 705/59 |
| 2003/0028490 | A1* | 2/2003 | Miura | ....................... G06F 21/10 705/59 |
| 2005/0195978 | A1* | 9/2005 | Babic | ....................... G06F 21/10 380/231 |
| 2010/0250389 | A1* | 9/2010 | Augustin | ................. G06F 21/10 705/26.1 |
| 2012/0090036 | A1* | 4/2012 | Kang | ....................... G06F 21/10 726/27 |

* cited by examiner

*Primary Examiner* — Meng Li
(74) *Attorney, Agent, or Firm* — Ballard Spahr, LLP

(57) ABSTRACT

A system and method for processing content access rights and/or entitlement rights are disclosed. A method, in one aspect, provides for receiving a selection of a content option, requesting access information associated with the selected content option, receiving access information comprising location information relating to a compatible format, requesting access rights from a first service associated with the location information, wherein the first service requests an access decision relating to the selected content option from a second service based upon the access rights, and receiving the access rights.

35 Claims, 7 Drawing Sheets

METHODS AND SYSTEMS FOR PROCESSING CONTENT RIGHTS

CROSS REFERENCE TO RELATED PATENT APPLICATION

This application is a continuation of U.S. application Ser. No. 14/859,939 filed Sep. 21, 2015, which is a continuation of U.S. application Ser. No. 13/671,139 filed Nov. 7, 2012, which issued as U.S. Pat. No. 9,177,158 which are herein incorporated by reference in their entirety.

BACKGROUND

Content can be provided to a user though many different devices. Content providers, publishers, and device manufacturers often rely on digital rights management (DRM) and other access control technologies to manage the use of content and content devices. Various DRM solutions such as Windows Media DRM, Adobe FlashAccess, PlayReady, Widevine, and Marlin require distinct license decision logic and license generation logic. Accordingly, providing diverse support for multiple DRM solutions requires an architecture capable of supporting the disparate requirements that each DRM solution imposes. Current systems and methods for managing content rights such as DRM do not provide a sufficient solution over multiple distinct devices and/or content players.

SUMMARY

It is to be understood that both the following general description and the following detailed description are exemplary and explanatory only and are not restrictive, as claimed. Provided are methods and systems for processing content rights and/or entitlement. The systems and methods of the present disclosure can be used to authenticate a user's right to consume content provided to a user through several devices. The systems and methods of the present disclosure can be used to control particular content provided to a particular device and/or user.

The systems and methods of the present disclosure can determine if a user or device can obtain a license or permission to receive and/or consume content for a particular type of content, classification of content or user, and/or segment of content. As an example, licenses can be generated to communicate permissions and rights in a particular format such as Adobe FlashAccess, Microsoft Windows Media DRM, Widevine, and Microsoft PlayReady, or other formats. Generating a license for any specific service or format can require matching third-party libraries with unique dependency requirements, data expression requirements, operating system architecture requirements, or idioms of implementation.

In an aspect, license decision logic for license generation can be implemented as a discrete unit in the architecture such that it is not directly accessed by end users. Any specific type of license generation can be isolated from other types of license decisions by implementing multiple discrete units in the architecture or software. As an example, a first license generation service, which can be end user facing, can be configured to process specific license generation tasks. As a further example, the first license generation service can call out to a central license decision service for a decision relating to granting licenses for particular content. In an aspect, based upon a received decision, the first license generation service can generate a first license or transmit a specific error response back to the requesting user or device. In an aspect, a second license generation service can be discrete from the first license generation service for processing specific formats and/or classifications of content.

In an aspect, methods can comprise receiving a selection of a content option. Access information based upon the selected content option can also be received. As an example, the access information can comprise location information relating to a first service for processing and/or generating access rights or licenses for content. As a further example, the first service can be configured to generate access rights or licenses for content or content devices having one or more compatible formats. Access rights and/or a license can be requested from the first service associated with the location information. The first service can request an access decision relating to the selected content option from a second service. The access decision can be received by the first service for generating or denying a license.

In another aspect, the methods can comprise receiving a license request at a first service element associated with a first identifier. A service element can be, for example, a licenses generation service or a license decision service. User information relating to the license request can also be received. As an example, access rights can be requested from a second service element associated with a second identifier. If the access rights are granted by the second service element, a license can be generated based upon one or more of the license request and the user information. If the access rights are denied, an error response can be generated.

In a further aspect, a first access decision request can be received from a first service element associated with a first identifier. First user information relating to the first access decision request can also be received. First access rights can be determined based upon the first user information and in response to the first license decision request. In an aspect, a second access decision request can be received from a second service element associated with a second identifier. Second user information relating to the second access decision request can also be received. Second access rights can be determined based upon the second user information and in response to the second access decision request.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
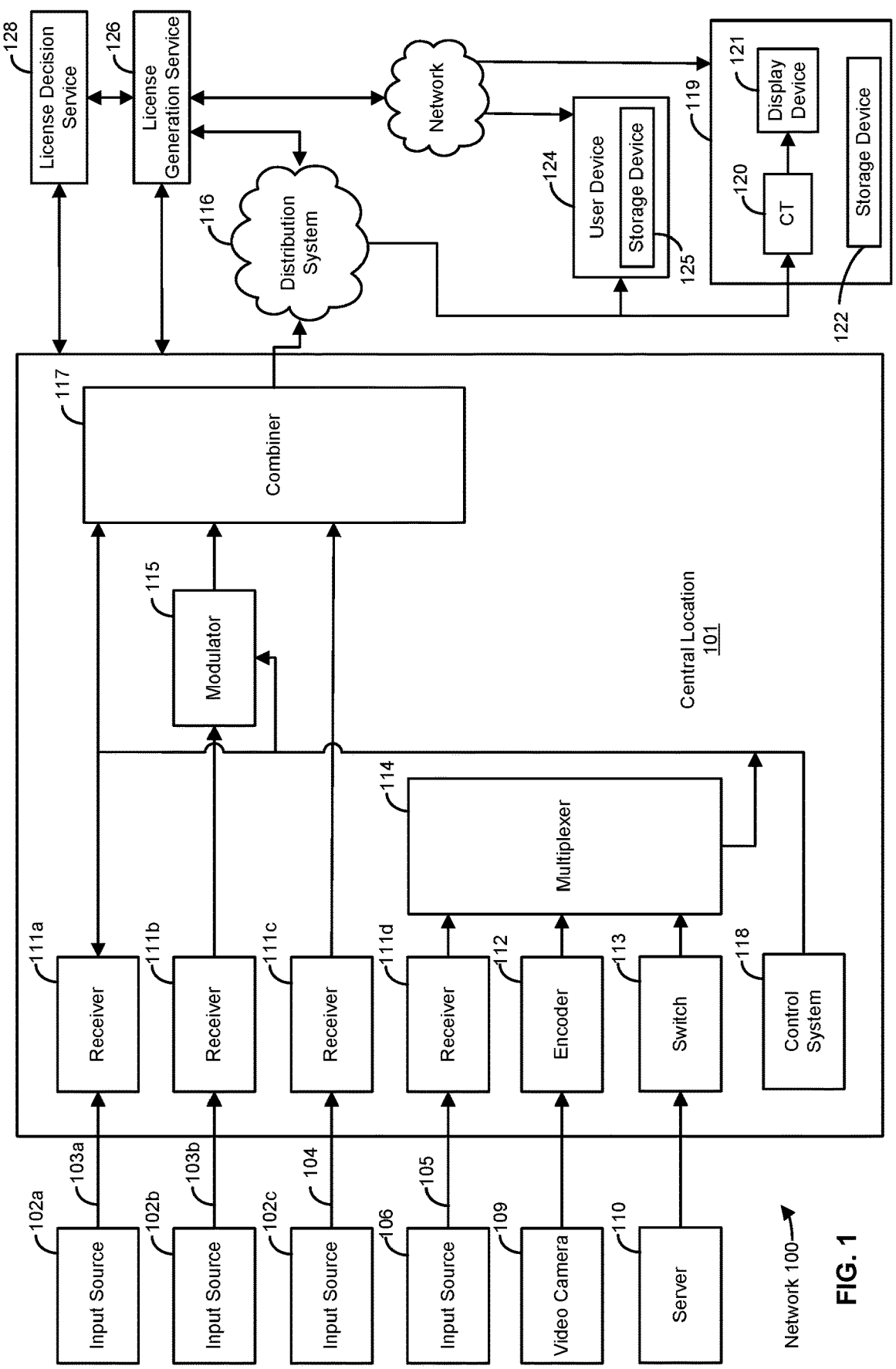
FIG. 1 is a block diagram of an exemplary network.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

"Relate" or "relating to" means concerning or pertaining to the subsequently described subject.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

As described in greater detail below, a system and network can be configured to control presentation of various types of content on a plurality of devices. In an aspect, user rights and/or entitlement to consume various content can be processed to determine whether a particular user and/or device has permission to consume particular content.

FIG. 1 illustrates various aspects of an exemplary network in which the present methods and systems can operate. The present disclosure relates to systems and methods for processing user rights and controlling content presentation. Those skilled in the art will appreciate that present methods may be used in systems that employ both digital and analog equipment. One skilled in the art will appreciate that provided herein is a functional description and that the respective functions can be performed by software, hardware, or a combination of software and hardware.

The network 100 can comprise a central location 101 (e.g., a control or processing facility in a fiber optic network, wireless network or satellite network, a hybrid-fiber coaxial (HFC) content distribution center, a processing center, headend, etc.) which can receive content, data, input programming, and the like, from multiple sources. The central location 101 can combine the content from the various sources and can distribute the content to user locations, such as location 119, via distribution system 116.

In an aspect, the central location 101 can create content or receive content from a variety of sources 102*a*, 102*b*, 102*c*. The content can be transmitted from the source to the central location 101 via a variety of transmission paths, including wireless (e.g. satellite paths 103*a*, 103*b*) and terrestrial path 104. The central location 101 can also receive content from a direct feed source 106 via a direct line 105. Other input sources can comprise capture devices, such as a video camera 109 or a server 110. The signals provided by the content sources can include, for example, a single content item or a multiplex that includes several content items. In an aspect, the central location 101 can create and/or receive applications, such as interactive applications. Such applications can be related to a particular content.

The central location 101 can comprise one or a plurality of receivers 111a, 111b, 111c, 111d that are each associated with an input source. For example, MPEG encoders such as encoder 112, are included for encoding local content or a video camera 109 feed. A switch 113 can provide access to server 110, which can be a Pay-Per-View server, a data server, an internet router, a network system, a phone system, and the like. Some signals may require additional processing, such as signal multiplexing, prior to being modulated. Such multiplexing can be performed by multiplexer (mux) 114.

The central location 101 can comprise one or a plurality of modulators 115 for interfacing to the distribution system 116. The modulators can convert the received content into a modulated output signal suitable for transmission over the distribution system 116. The output signals from the modulators can be combined, using equipment such as a combiner 117, for input into the distribution system 116.

A control system 118 can permit a system operator to control and monitor the functions and performance of network 100. The control system 118 can interface, monitor, and/or control a variety of functions, including, but not limited to, the channel lineup for the television system, billing for each user, conditional access for content distributed to users, and the like. Control system 118 can provide input to the modulators for setting operating parameters, such as system specific MPEG table packet organization or conditional access information. The control system 118 can be located at central location 101 or at a remote location.

The distribution system 116 can distribute signals from the central location 101 to user locations, such as user location 119. The distribution system 116 can be an optical fiber network, a coaxial cable network, a hybrid fiber-coaxial network, a wireless network, a satellite system, a direct broadcast system, or any combination thereof. There can be a multitude of user locations connected to distribution system 116. At user location 119, there may be an interface comprising a decoder 120, such as a gateway or communications terminal (CT) that can decode, if needed, the signals for display on a display device 121, such as on a television set (TV) or a computer monitor. Various wireless devices may also be connected to the network at, or proximate, user location 119. Those skilled in the art will appreciate that the signal can be decoded in a variety of equipment, including an CT, a fixed or mobile computing device, a TV, a monitor, or satellite receiver. In an exemplary aspect, the methods and systems disclosed can be located within, or performed on, one or more wireless device, CT's 120, display devices 121, central locations 101, DVR's, home theater PC's, and the like. As an example, a storage device 122 can be in communication with one or more of the CT 120, the display device 121, and the central location 101 to send/receive content therebetween. As a further example, the storage device 122 can be located remotely from the user location 119, such as a network storage.

In an aspect, user location 119 is not fixed. By way of example, a user can receive content from the distribution system 116 on a mobile device, such as a laptop computer, PDA, smartphone, GPS, vehicle entertainment system, portable media player, and the like.

In an aspect, a user device 124 can receive signals from the distribution system 116 for rendering content on the user device 124. As an example, rendering content can comprise providing audio and/or video, displaying images, facilitating an audio or visual feedback, tactile feedback, and the like. However, other content can be rendered via the user device 124. In an aspect, the user device 124 can be an CT, a set-top box, a television, a computer, a smartphone, a laptop, a tablet, a multimedia playback device, a portable electronic device, and the like. As an example, the user device 124 can be an Internet Protocol compatible device for receiving signals via a network such as the Internet or some other communications network for providing content to the user. It is understood that other display devices and networks can be used. It is further understood that the user device 124 can be a widget or a virtual device for displaying content in a picture-in-picture environment such as on the display device 121, for example. As an example, a storage device 125 can be in communication with one or more of the user device 124 and the central location 101 to send/receive content therebetween. As a further example, the storage device 125 can be located remotely from the user device 124, such as a network storage medium.

In an aspect, a license generation system or service 126 can be in communication with one or more of the CT 120 and the user device 124 or other devices. The license generation service 126 can be an access control system, software as a service, a computing device functioning as a license generation service, and/or a user rights authentication device, and the like. As an example, licenses can be generated to communicate permissions and rights in a particular format (e.g., Adobe FlashAccess, Microsoft Windows Media DRM, Widevine, Micro soft PlayReady, etc.). As a further example, generating a license for any specific technology can comprise matching third party libraries with the technology dependency requirements, data expression requirements, operating system architecture requirements, idioms of implementation, and the like. In an aspect, one or more license generating services 126 can be implemented for a particular technology or operating format. As an example, each technology can implement a distinct license generating service 126. As a further example, one or more of the CT 120 and the user device 124 can communicate with one or more of the license generation services 126 to request and/or receive a content license.

In an aspect, a license decision system or service 128 can be in communication with one or more license generation services 126 and/or one or more of the CT 120 and the user device 124 to determine access rights or entitlement for a particular user and/or device. As an example, the license decision service 128 can be configured as an access control system, software as a service, a computing device functioning as a license decision service, and/or a user rights authentication device. In an aspect, a user and/or device can have certain user rights associated with the content that the particular user and/or device can consume. As an example, a user may have the rights to store certain programming on a digital recorder, storage medium, buffer, or the like. As a further example, a user may have rights to consume particular content or programming. In an aspect, one or more license decision services 128 can determine whether a particular user and/or device has appropriate rights to consume certain content. As an example, one or more license decision services 128 can communicate a determination (e.g., a decision) of entitlement to one or more license generating services 126 to facilitate generation of a license for particular content or media.

Figure 2:
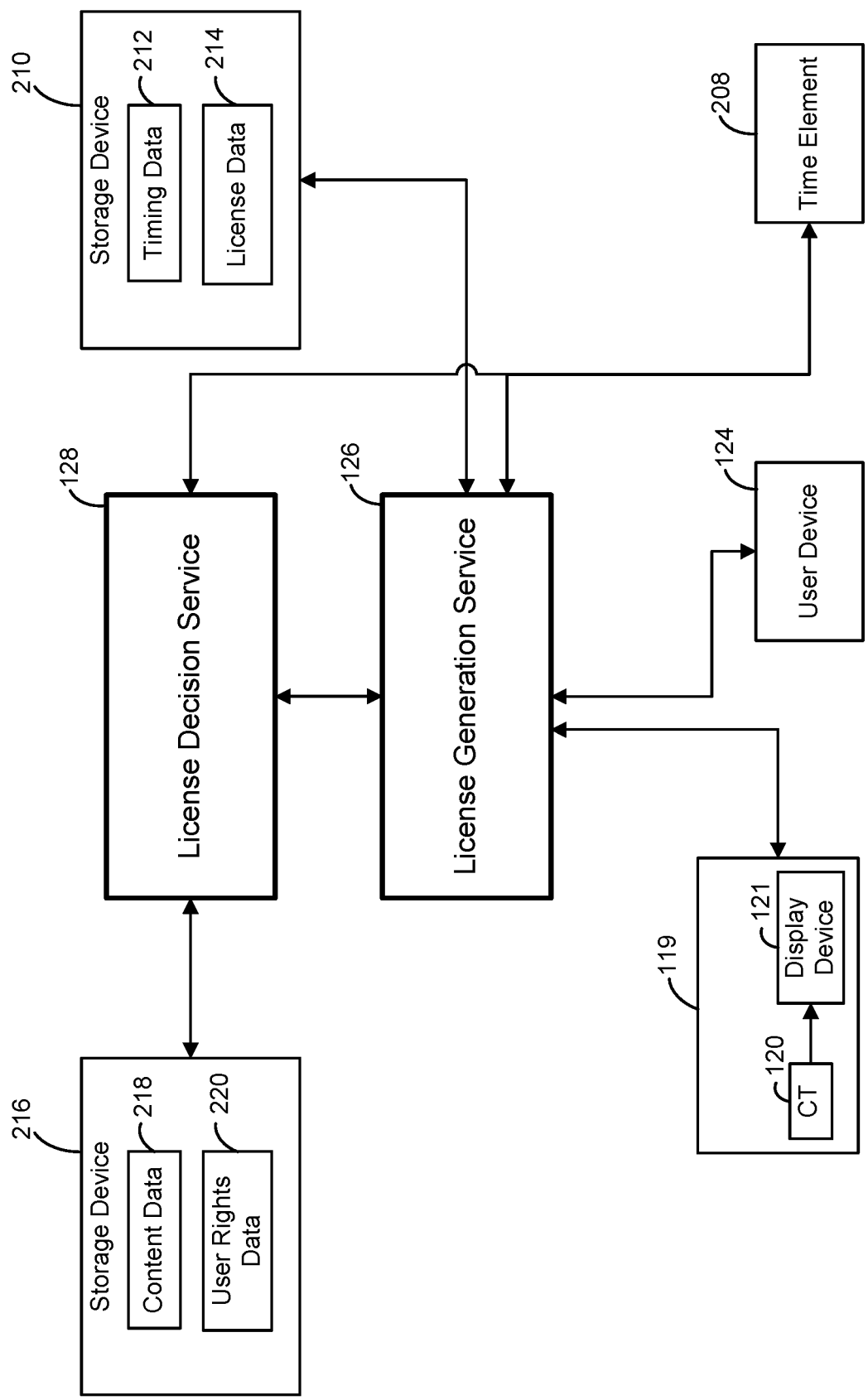
FIG. 2 is a block diagram on an exemplary network.

In an aspect, a system and network can be used to authenticate entitlement of a particular user and/or device for the consumption of particular content. In an aspect, FIG. 2 illustrates various aspects of an exemplary system in which some of the disclosed methods and systems can operate. In an aspect, one or more of the license generation service 126 and the license decision service 128 can be in communication with the CT 120, the user device 124, the Internet, and/or a communication network to receive information relating to content being delivered to a particular user. As an example, other service elements, such as software, virtual elements, computing devices, router devices, and the like, can comprise or serve as one or more of the license generation service 126 and the license decision service 128. As a further example, the functions of one or more of the license generation service 126 and the license decision service 128 can be executed by one or more devices. In an aspect, one or more of the license generation service 126 and the license decision service 128 can be disposed remotely from the user location 119. However, one or more of the license generation service 126 and the license decision service 128 can be disposed anywhere, including at the user location 119 to reduce network latency, for example.

In an aspect, a time element 208 can be in communication with one or more of the license generation service 126 and the license decision service 128 to provide a timing reference thereto. As an example, the time element 208 can be a clock. As a further example, the time element 208 can transmit information to one or more of the license generation service 126 and the license decision service 128 for associating a time stamp with a particular event received by one or more of the license generation service 126 and the license decision service 128. In an aspect, one or more of the license generation service 126 and the license decision service 128 can cooperate with the time element 208 to associate a time stamp with events having an effect on the content delivered to the CT 120 and/or the user device 124, such as, for example, license request, license grant, subscription lifecycle, license denial, a channel tune, a remote tune, remote control events, playpoint audits, playback events, program events including a program start time and/or end time and/or a commercial/intermission time, and/or playlist timing events, and the like.

In an aspect, a storage device 210 can be in communication with one or more of the license generation service 126 to allow the one or more of the license generation service 126 to store and/or retrieve data to/from the storage device 210. As an example, the storage device 210 can store data relating to timing data 212 and/or license data 214 relating to content transmitted or scheduled to be transmitted to the CT 120 and/or the user device 124. In an aspect, the timing data 212 can be a time stamp or other time marker for indicating a date and/or time associated with one or more of a transmission of content, a request for content, a request for playback, a storage of content, a deletion of content, and/or a state/status and/or a change in state/status of an entitlement or user right. As an example, the timing data 212 can comprise any number of time-related entries and/or markers. As a further example, the timing data 212 can comprise one or more of a table of time-related data entries, a timing log, a database of time-related information, and the like. Other information can be stored as the timing data.

In an aspect, the license data 214 can comprise information relating to the permissions and/or entitlements associated with a particular user and/or device. As an example, the license data 214 can comprise information relating to access control management for a particular device and/or formatted system or software. In an aspect, the license data 214 can be associated with a source of the content and/or a content consumer (e.g., content player, encoder, rendering system, etc.). As a further example, the license data 214 can have time stamps or markers associated therewith. In an aspect, the license data 214 can be classified based upon specific types, classifications, or formats of license generation. As an example, a license generation service for a first service can rely on license data 214 associated with the first solution, while a license generation service for a second solution can rely on license data 214 associated with the second solution. In an aspect, the license data 214 can be used to generate a license to facilitate the consumption of content via a particular device, system, or software. The storage device 210 can store information relating to users, user preferences, and user devices and configurations.

In an aspect, a storage device 216 can be in communication with one or more of the license decision services 128 to allow the one or more of the license generation services 126 to store and/or retrieve data to/from the storage device 216. As an example, the storage device 216 can store data relating to content data 218 and/or user rights data 220. In an aspect, the storage device 216 can store data relating to content transmitted or scheduled to be transmitted to the CT 120 and/or the user device 124.

In an aspect, the content data 218 can comprise information relating to the permissions and/or entitlements associated with a particular content and/or device. As an example, the content data 218 can comprise information, such as subscription information, identification information, location information, and/or timing information relating to a particular content, media, and/or programming. In an aspect, the content data 218 can be associated with a source of the content. As a further example, the content data 218 can have time stamps or markers associated therewith. In an aspect, the content data 218 can be used to determine whether a request for a license to particular content should be granted or denied. For example, a particular content offering can have associated therewith content data 218 comprising requirements that must be met in order to grant a license to the content offering. The storage device 216 can store information relating to content, entitlement, users, devices and configurations relating to the same.

In an aspect, the user rights data 220 can comprise information relating to the permissions and/or entitlements associated with a particular user and/or device. As an example, the user rights data 220 can comprise information, such as subscription information, identification information, location information, and/or timing information relating to a particular user or user device. In an aspect, the user rights data 220 can be associated with a source of the content. As a further example, the user rights data 220 can have time stamps or markers associated therewith. The storage device 216 can store information relating to users, user preferences, and user devices and configurations.

In an aspect, user rights can be authorized and/or authenticated based upon one or more of the timing data 214, the license data 216, the content data 218, and the user rights data 220. In an aspect, a user can consume content as long as the user has the appropriate user rights associated with the content.

In an aspect, a system and network can be configured to control presentation of various types of content on a plurality of devices. In an aspect, user rights and/or entitlement to consume various content can be processed to determine whether a particular user and/or device has permission to consume the content.

Figure 3A:
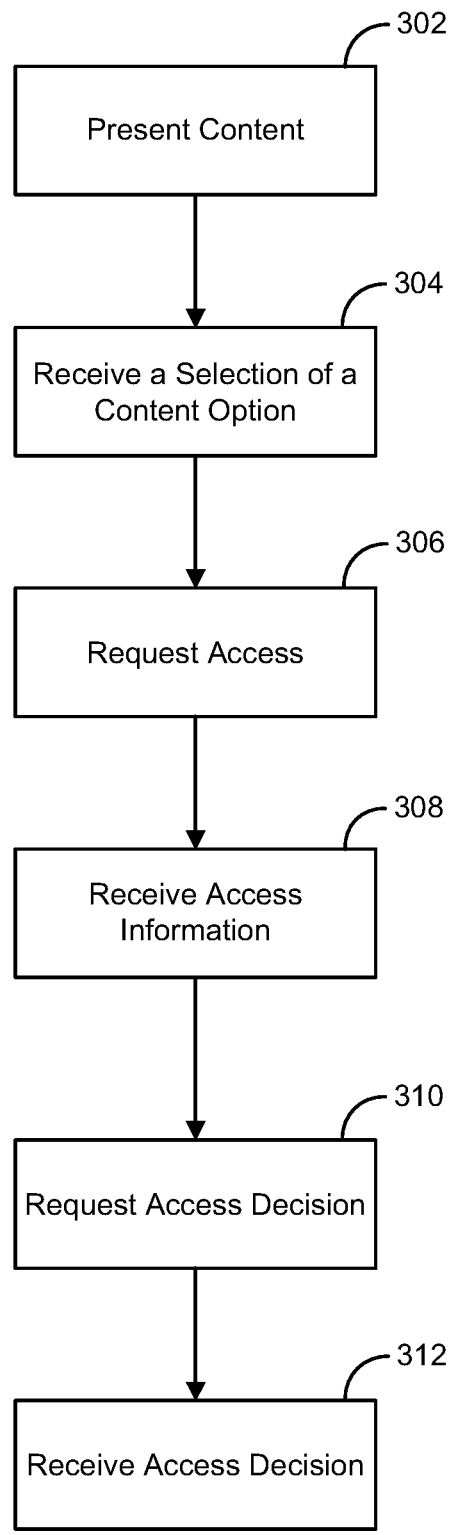
FIG. 3A is a flow chart of an exemplary method.
Figure 3B:
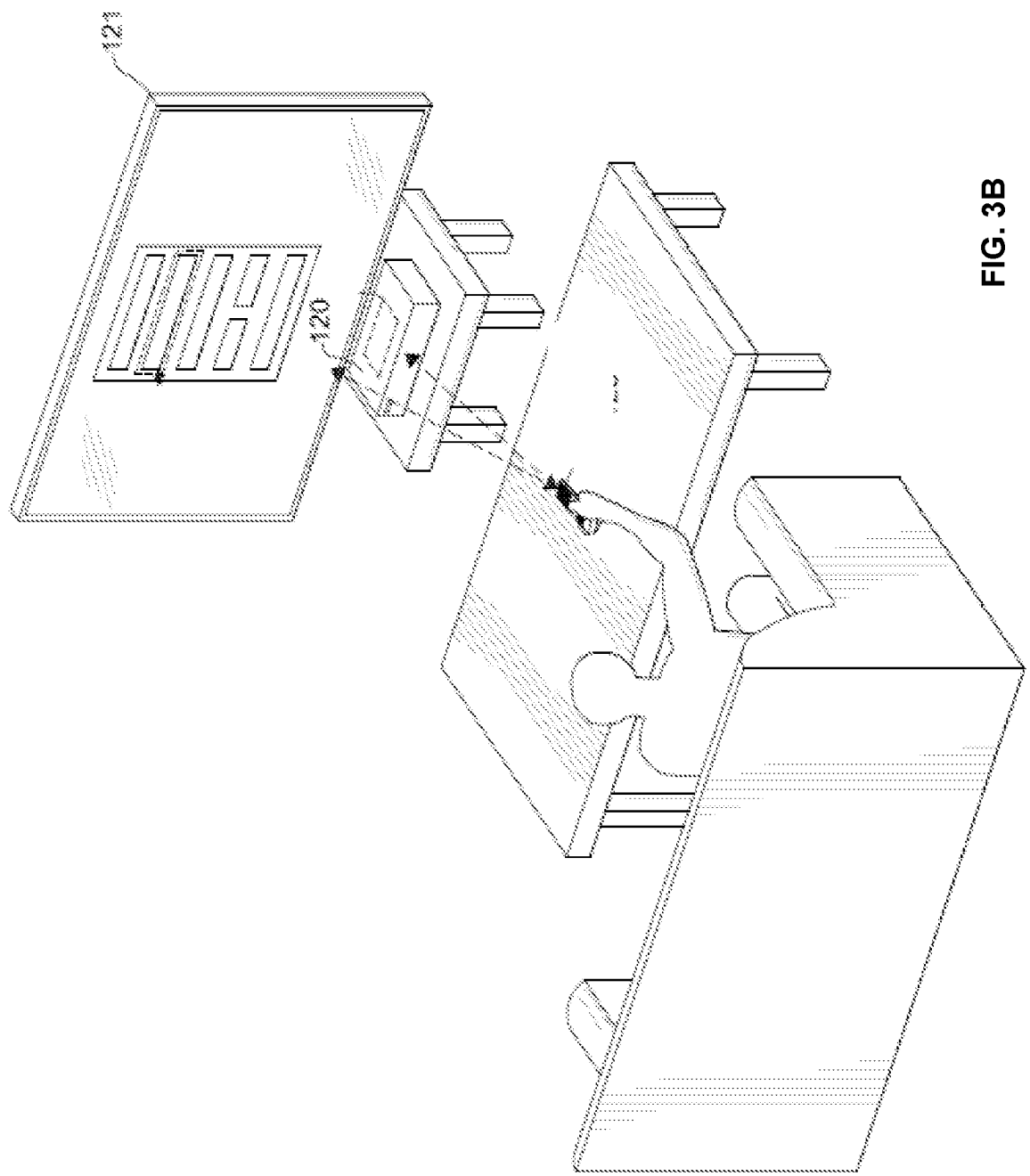
FIG. 3B is a graphical representation of an exemplary user environment.

In an aspect, illustrated in FIG. 3A, provided are methods for controlling media content presented to a user. In step 302, content can be presented to a user and/or a device such as user device 124, CT 120, display device 121, or the like. As an example, one or more content options, such as menu items, selectable elements, programming guides, video on demands, or recorded content lists, can be presented to a user such as on a display (e.g., display device 121), as illustrated in FIG. 3B.

Returning to FIG. 3A, in step 304, a selection of a content option can be received. In an aspect, a user can select one or more content options presented in step 302. As an example, a user can select one or more content options relating to content that a user desires to consume. In an aspect, one or more content options can comprise a menu item, programming guide, control option, media playback, media recording, video-on-demand options, pay-per-view options, options relating to streaming audio/video, and the like.

In step 306, access can be requested for particular content. In an aspect, a recipient of the selection of the content option can request access information. As an example, a device configured to present content options to a user can receive information relating to the selection of one or more content options. As a further example, the device can request access to the content associated with the selected content option. In an aspect, the access information can be requested from a content server or system configured to manage content distribution and/or access control. As an example, access information can be requested from and/or provided by one or more of an enterprise service registry and/or a configuration file. As a further example, the access information can be dynamically generated into presentation expressions (e.g., JavaScript, HTML, etc.) and/or inserted into a specific content file during packaging/encrypting as a license acquisition uniform resource locator (URL).

In step 308, access information can be received. In an aspect, a device requesting content or a license for content can receive the access information in response to the request for access in step 306. As an example, the device can request access to particular content. As a further example, the device can receive access information in response to the request for access. In an aspect, the access information can comprise location information relating to a system and/or service for access control (e.g., license generation service 126). As an example, the location information can comprise a uniform resource identifier (URI) such as a URL. As a further example, the URL can be associated with an access control system or service.

In an aspect, the access information can comprise data relating to a particular format. As a further example, each of a plurality of formats of content or content readers can have particular location information. As such, when a particular format is requested, the returned access information can comprise the location information associated with the requested format. In an aspect, the access information can comprise a location identifier for an access control element associated with the selected content option. As an example, the access information can be encrypted. As a further example, the encryption can be associated with the compatible format (e.g., format of content, compatible format for content reader, etc.).

In step 310, an access decision can be requested. In an aspect, the access decision can be a license. As an example, the access decision can be requested by transmitting a request to a first service (e.g., license generation service 126) associated with the location information. In an aspect, requesting an access decision can comprise requesting a license such as a digital rights management license. As an example, requesting an access decision can comprise transmitting a request to the URL received in step 308. As a further example, the request transmitted to the URL can comprise information relating to a user and/or device transmitting the request. In an aspect, requesting an access decision can comprise requesting a license decision. As an example, the first service can receive an access decision request and can call out to or forward the request to a second service (e.g., license decision service 128) or access control system.

In step 312, an access decision can be received. In an aspect, the access decision can be communicated to the requesting user and or device. As an example, the access decision can comprise a license to consume particular content. As a further example, the access decision can comprise an error response indicating a license has not been generated.

Figure 4:
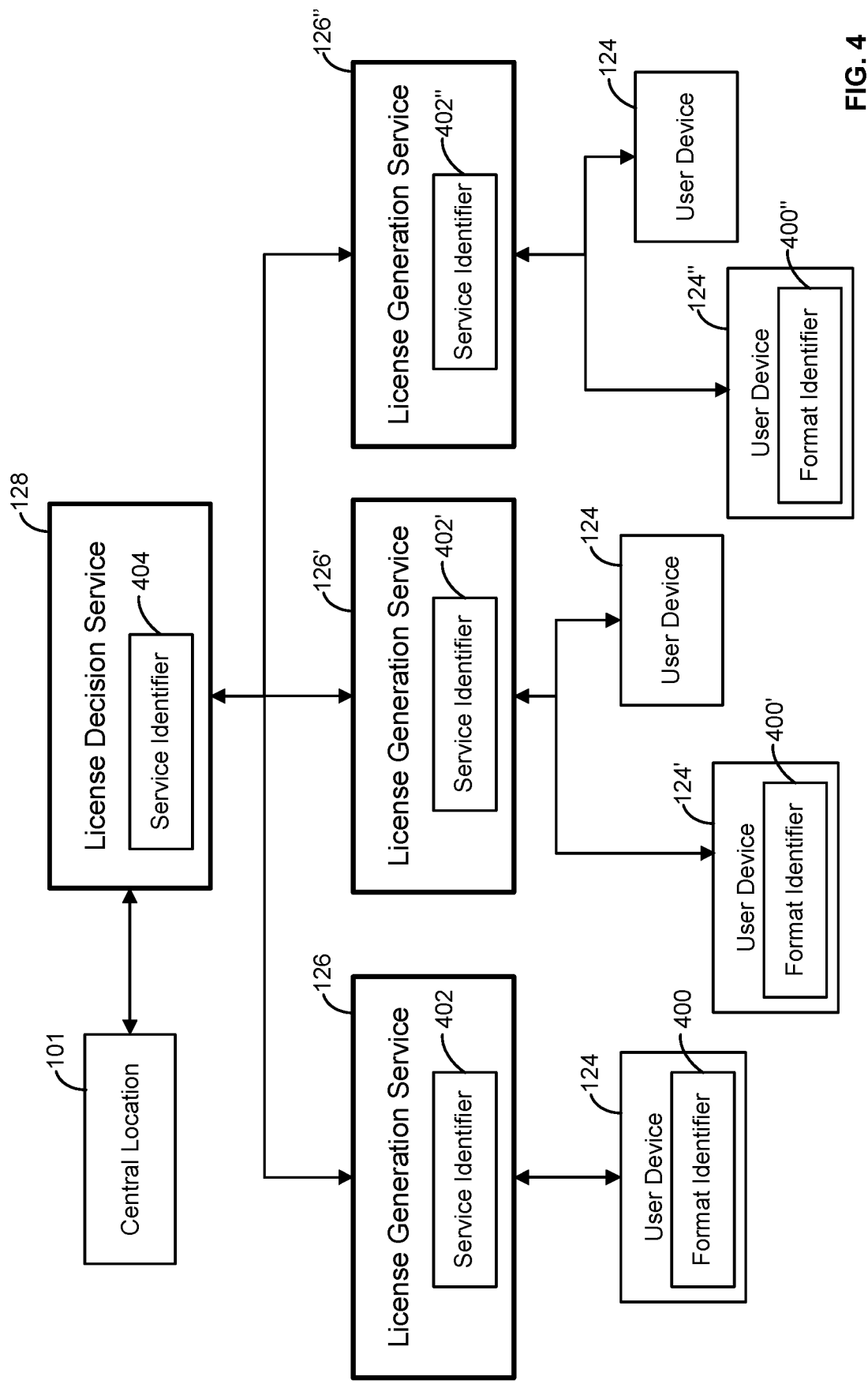
FIG. 4 is a block diagram on an exemplary network.

FIG. 4 illustrates various aspects of an exemplary system in which the present methods can operate. In an aspect, a plurality of the license generation services 126, 126', 126" and/or one or more license decision services 128 can be in communication with one or more of a plurality of user devices 124, 124', 124" the central location 101, the Internet, and/or a communication network to receive information relating to content being delivered to a particular user. As an example, other communications elements, such as software, virtual elements, computing devices, router devices, and the like, can comprise or serve as one or more of the license generation services 126, 126', 126" and the license decision services 128.

In an aspect, one or more of the user devices 124, 124', 124" can be associated and/or compatible with a particular format (e.g., DRM solution, encoding, rendering format, etc.). In an aspect, a format identifier 400, 400', 400" can be associated with the format of a particular user device 124, 124', 124". As an example, a first format identifier 400 can be associated with a first format compatible with one or more of the user devices 124, 124', 124". As another example, a second format identifier 400' can be associated with a second format compatible with one or more of the user devices 124, 124', 124". As a further example, a third format identifier 400' can be associated with a third format compatible with one or more of the user devices 124, 124', 124".

In an aspect, one or more of the license generation services 126, 126', 126" can be associated and/or compatible with a particular format (e.g., DRM solution, encoding, rendering format, etc.). In an aspect, a service identifier 402, 402', 402" can be associated with a particular one of the license generation services 126, 126', 126". As an example, a first service identifier 402 can be associated with a first license generation service 126. As another example, a second service identifier 402' can be associated with a second license generation service 126'. As a further example, a third service identifier 400' can be associated with a third license generation service 126". In this way, each of the license generation services 126, 126', 126" can be associated with a discrete service identifier 402, 402', 402". As an example, one or more of the service identifiers 402, 402', 402" can be an addressable element such as a URL. As a further example, one or more of the user devices 124, 124', 124" can communicate with one or more of the license generation services 126, 126', 126" using the service identifiers 402, 402', 402".

In an aspect, a service identifier 404 can be associated with one or more of the license decision service 128. As an example, the service identifier 404 can be an addressable element such as a URL. As a further example, one or more of the user devices 124, 124', 124" and/or license generation services 126, 126', 126" can communicate with one or more of the license decision service 128 using the service identifier 404.

Figure 5:
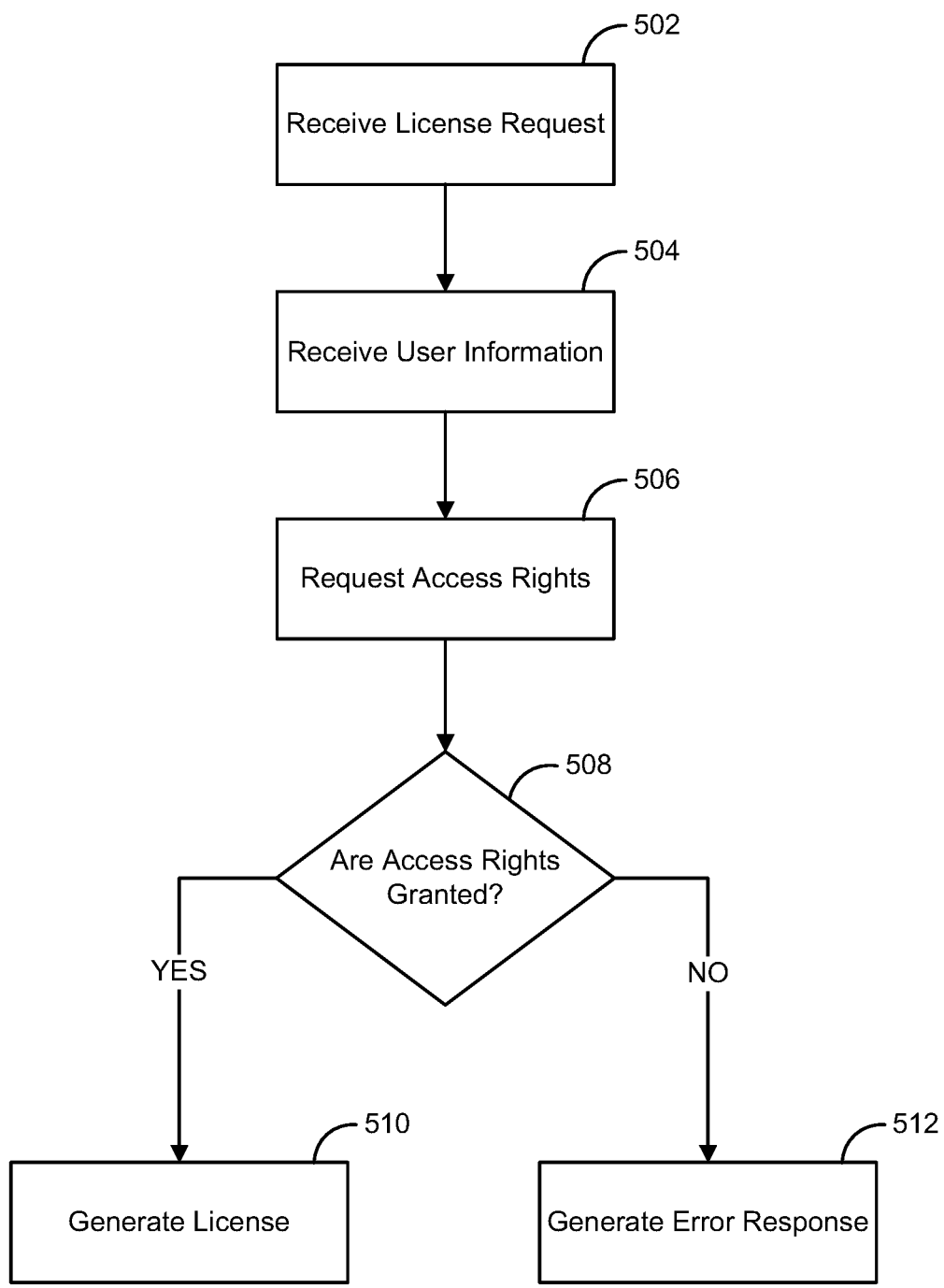
FIG. 5 is a flow chart of an exemplary method.

In an aspect, FIG. 5 illustrates a method for controlling content presented to one or more users and/or user devices. In step 502, a license request can be received. As an example, the license request can be received at a first service element such as, for example, license generation services 126, 126', 126" associated with a first identifier such as, for example, service identifiers 402, 402', 402". In an aspect, one or more users and/or user devices can request a license to consume particular content. As an example, a particular device having a particular format can request a license from an associated service such as license generation services 126, 126', 126".

In step 504, user information can be received. As an example, the user information can relate to the license request. In an aspect, the user information can comprise the user rights data 220 and can relate to the permissions and/or entitlements associated with a particular user and/or device. As an example, the user information can comprise information, such as subscription information, identification information, location information, and/or timing information relating to a particular user or user device. In an aspect, the user information can be associated with a source of the content.

In step 506, access rights can be requested. As an example, the access rights can be requested from a second service element associated with a second identifier. As an example, requesting access rights can comprise transmitting a request to a URL associated with an access control system or service. As a further example, the request transmitted to the URL can comprise information relating to a user and/or device transmitting the request. In an aspect, requesting an access decision can comprise requesting a license decision from license decision service 128. As an example, the first service can receive an access decision request and can call out to or forward the request to a second service from license decision service 128 or access control system.

In step 508, a determination can be made regarding the granting of access rights. In an aspect, a user and/or device can have certain user rights associated with the content that the particular user and/or device can consume. As an example, a user may have the rights to store (e.g., buffer, cache, temporarily storage, long-term storage, local storage, remote, storage, etc.) certain programming on a digital recorder. As a further example, a user may have rights to consume particular content or programming. In an aspect, one or more license decision services 128 can determine whether a particular user and/or device has appropriate rights to consume certain content. As an example, one or more license decision services 128 can communicate a determination of entitlement (e.g., decision) to one or more license generating services 126 to facilitate generation of a license for particular content or media.

In step 510, if the access rights are granted, a license can be generated based upon one or more of the license request and the user information. If the access rights are denied, an error response can be generated at step 512.

Figure 6:
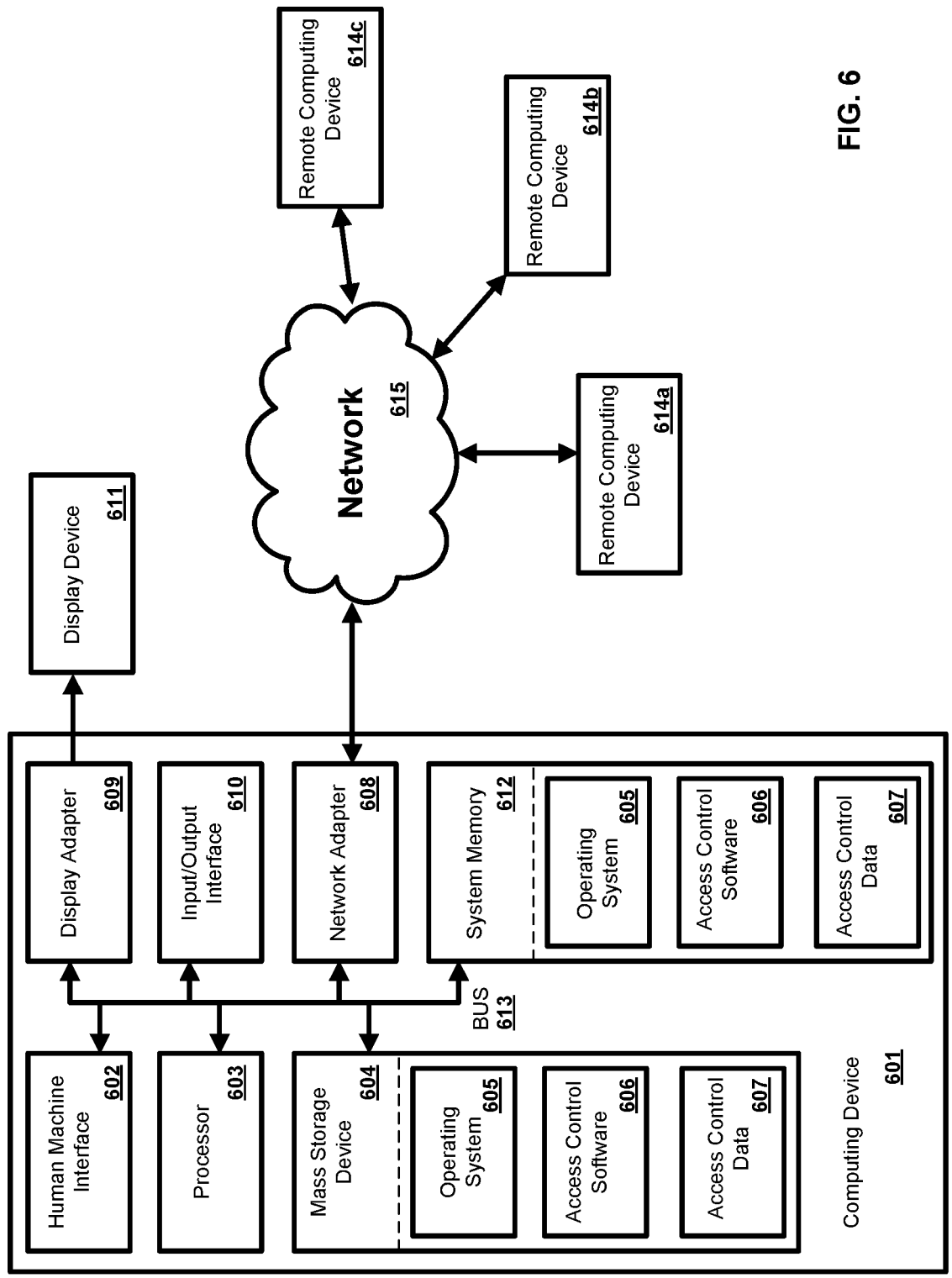
FIG. 6 is a block diagram of an exemplary computing device.

In an aspect, the methods and systems can be implemented on a computing system such as computing device 601 as illustrated in FIG. 6 and described below. By way of example, one or more of the license generation service 126 and the license decision service 128 of FIG. 2 can be a computing device as illustrated in FIG. 6. Similarly, the methods and systems disclosed can utilize one or more computers to perform one or more functions in one or more locations. FIG. 6 is a block diagram illustrating an exemplary operating environment for performing the disclosed methods. One skilled in the art will appreciate that provided herein is a functional description and that the respective functions can be performed by software, hardware, or a combination of software and hardware. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 601. The components of the computer 601 can comprise, but are not limited to, one or more processors or processing units 603, a system memory 612, and a system bus 613 that couples various system components including the processor 603 to the system memory 612. In the case of multiple processing units 603, the system can utilize parallel computing.

The system bus 613 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 613, and all buses specified in this description can also be implemented over a wired or wireless network connection and each of the subsystems, including the processor 603, a mass storage device 604, an operating system 605, access control software 606, access control data 607, a network adapter 608, system memory 612, an Input/Output Interface 610, a display adapter 609, a display device 611, and a human machine interface 602, can be contained within one or more remote computing devices 614a,b,c at physically separate locations, connected through buses of this form, in effect implementing a fully distributed system.

The computing device 601 typically comprises a variety of computer readable media. Exemplary readable media can be any available media that is accessible by the computing device 601 and comprises, for example and not meant to be limiting, both volatile and non-volatile media, removable and non-removable media. The system memory 612 comprises computer readable media in the form of volatile memory, such as random access memory (RAM), and/or non-volatile memory, such as read only memory (ROM). The system memory 612 typically contains data, such as access control data 607, and/or program modules, such as operating system 605 and access control software 606 that are immediately accessible to and/or are presently operated on by the processing unit 603.

In another aspect, the computing 601 can also comprise other removable/non-removable, volatile/non-volatile computer storage media. By way of example, FIG. 6 illustrates a mass storage device 604 which can provide non-volatile storage of computer code, computer readable instructions, data structures, program modules, and other data for the computing device 601. For example and not meant to be limiting, a mass storage device 604 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 604, including by way of example, an operating system 605 and access control software 606. Each of the operating system 605 and access control software 606 (or some combination thereof) can comprise elements of the programming and the access control software 606. Access control data 607 can also be stored on the mass storage device 604. Access control data 607 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 601 via an input device (not shown). Examples of such input devices comprise, but are not limited to, a keyboard, pointing device (e.g., a "mouse"), a microphone, a joystick, a scanner, visual systems, such as Microsoft's Kinect, audio systems that process sound such as music or speech, a traditional silver remote control, tactile input devices such as gloves, touch-responsive screen, body coverings, and the like These and other input devices can be connected to the processing unit 603 via a human machine interface 602 that is coupled to the system bus 613, but can be connected by other interface and bus structures, such as a parallel port, game port, an IEEE 1394 Port (also known as a Firewire port), a serial port, or a universal serial bus (USB).

In yet another aspect, a display device 611 can also be connected to the system bus 613 via an interface, such as a display adapter 609. It is contemplated that the computer 601 can have more than one display adapter 609 and the computing device 601 can have more than one display device 611. For example, a display device can be a monitor, an LCD (Liquid Crystal Display), or a projector. In addition to the display device 611, other output peripheral devices can comprise components such as speakers (not shown) and a printer (not shown) which can be connected to the computing device 601 via Input/Output Interface 610. Any step and/or result of the methods can be output in any form to an output device. Such output can be any form of visual representation, including, but not limited to, textual, graphical, animation, audio, tactile, and the like. The display 611 and computing device 601 can be part of one device, or separate devices.

The computing device 601 can operate in a networked environment using logical connections to one or more remote computing devices 614a,b,c. By way of example, a remote computing device can be a personal computer, portable computer, a smartphone, a server, a router, a network computer, a peer device or other common network node, and so on. Logical connections between the computing device 601 and a remote computing device 614a,b,c can be made via a network 615, such as a local area network (LAN) and a general wide area network (WAN). Such network connections can be through a network adapter 608. A network adapter 608 can be implemented in both wired and wireless environments. Such networking environments are conventional and commonplace in dwellings, offices, enterprise-wide computer networks, intranets, and the Internet.

For purposes of illustration, application programs and other executable program components such as the operating system 605 are illustrated herein as discrete blocks, although it is recognized that such programs and components reside at various times in different storage components of the computing device 601, and are executed by the data processor(s) of the computer. An implementation of access control software 606 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information, such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A system comprising:
   a license generation apparatus comprising one or more processors and a memory storing processor-executable instructions that, when executed by the one or more processors of the license generation apparatus, cause the license generation apparatus to:
   send a request for an access decision associated with content;
   a license decision apparatus comprising one or more processors and a memory storing processor-executable instructions that, when executed by the one or more processors of the license decision apparatus, cause the license decision apparatus to:
   receive, from a license generation service of a plurality of license generation services of the license generation apparatus, the request for the access decision, wherein the license generation service of the plurality of license generation services is associated with a license generation of a particular format, wherein the plurality of license generation services are remotely located from a user device;
   determine, based on a compatibility between the content and the particular format and one or more requirements, the access decision, wherein the one or more requirements are associated with one or more of: the content, the user device, or a user associated with the user device, and
   send the access decision to the license generation apparatus; and
   wherein the processor-executable instructions stored in the memory of the license generation apparatus, when executed by the one or more processors of the license generation apparatus, further cause the license generation apparatus to:
   generate a license when the access decision indicates a granting of access rights, or
   generate a denial of the license when the access decision indicates a denial of access rights.

2. The system of claim 1, wherein the processor-executable instructions stored in the memory of the license decision apparatus that, when executed by the one or more processors, cause the license decision apparatus to determine the access decision, further cause the license decision apparatus to determine whether the one or more requirements are satisfied based on timing information associated with the request for the access decision or the content.

3. The system of claim 1, wherein the processor-executable instructions stored in the memory of the license decision apparatus that, when executed by the one or more processors, cause the license decision apparatus to determine the access decision, further cause the license decision apparatus to:
   access stored user rights data associated with the user device or the user associated with the user device; and
   determine whether the one or more requirements are satisfied based on one or more permissions indicated in the stored user rights data.

4. The system of claim 1, wherein the license generation apparatus corresponds to a first classification of content, wherein the content is included in the first classification of content, and wherein the processor-executable instructions stored in the memory of the license decision apparatus, when executed by the one or more processors, further cause the license decision apparatus to:
   receive, via a second license generation apparatus corresponding to a second classification of content, a second request for an access decision associated with second content included in the second classification of content.

5. The system of claim 1, wherein the license generation apparatus corresponds to a classification of a plurality of classifications of content.

6. The system of claim 1, wherein the license generation apparatus corresponds to a content format of a plurality of content formats.

7. A system comprising:
   a license generation apparatus comprising one or more processors and a memory storing processor-executable instructions that, when executed by the one or more processors of the license generation apparatus, cause the license generation apparatus to:
   receive, by a license generation service of a plurality of license generation services of the license generation apparatus, via a user device, a request for access rights for content, wherein the license generation service of the plurality of license generation services is associated with a license generation of a particular format, and wherein the plurality of license generation services are remotely located from the user device, and
   send, by the license generation service, a request for an access decision for the content;
   a license decision apparatus comprising one or more processors and a memory storing processor-executable instructions that, when executed by the one or more processors of the license decision apparatus, cause the license decision apparatus to:
   receive the request for the access decision, and determine, based on a compatibility between the content, the particular format, and the user device, the access decision for the content; and wherein the processor-executable instructions stored in the memory of the license generation apparatus, when executed by the one or more processors of the license generation apparatus, further cause the license generation apparatus to:

receive the access decision for the content;

generate, based on the access decision, a license or an access denial; and send, to the user device, the license or the access denial.

8. The system of claim 7, wherein the processor-executable instructions stored in the memory of the license generation apparatus that, when executed by the one or more processors, cause the license generation apparatus to receive the request for access rights, further cause the license generation apparatus to receive the request for access rights via a first uniform resource identifier.

9. The system of claim 8, wherein the processor-executable instructions stored in the memory of the license generation apparatus that, when executed by the one or more processors, cause the license generation apparatus to send the request for the access decision, further cause the license generation apparatus to send the request for the access decision via a second uniform resource identifier, wherein the second uniform resource identifier is different from the first uniform resource identifier.

10. The system of claim 8, wherein the first uniform resource identifier corresponds to the license generation apparatus.

11. The system of claim 7, wherein the license generation apparatus corresponds to a classification of content of a plurality of classifications of content.

12. The system of claim 7, wherein the license generation apparatus corresponds to a content format of a plurality of content formats.

13. An apparatus, comprising:

one or more processors; and a memory storing processor-executable instructions that, when executed by the one or more processors, cause the apparatus to:

receive a first uniform resource identifier corresponding to a license generation service of a plurality of license generation services, wherein each license generation service of the plurality of license generation services is remotely located from a user device, and wherein the license generation service of the plurality of license generation services is associated with a license generation of a particular format;

send, to the license generation service via the first uniform resource identifier, a request for access rights to content, wherein the request for access rights to content causes the license generation service to:

determine, based on a compatibility between the content, the particular format, and the user device, an access decision; and generate, based on the access decision, a license or a denial of access rights; and receive, via the license generation service, the license or the denial of access rights.

14. The apparatus of claim 13, wherein the first uniform resource identifier is a uniform resource identifier of a plurality of uniform resource identifiers uniquely identifying a respective license generation service.

15. The apparatus of claim 13, wherein the processor-executable instructions, when executed by the one or more processors, further cause the apparatus to receive the first uniform resource identifier in response to a selection of the content.

16. The apparatus of claim 13, wherein the request for access rights comprises information identifying the user device or a user associated with the user device.

17. The apparatus of claim 13, wherein the license generation service corresponds to a classification of content of a plurality of classifications of content.

18. The apparatus of claim 13, wherein the license generation service corresponds to a content format of a plurality of content formats.

19. The apparatus of claim 18, wherein each content format of the plurality of content formats corresponds to a respective location.

20. An apparatus, comprising:

one or more processors; and a memory storing processor-executable instructions that, when executed by the one or more processors, cause the apparatus to:

receive a selection of a content option;

receive, based on the selected content option, access information comprising a first uniform resource identifier associated with a digital rights management solution of a plurality of digital rights management solutions;

send, to a first service element via the first uniform resource identifier, a request for access rights, wherein the first service element is configured to:

request, based on the requested access rights, an access decision from a second service element via a second uniform resource identifier, wherein the access decision relates to the selected content option and at least in part to a compatible format;

generate a license when the access rights are granted; or generate a denial of license when the access rights are denied; and receive, based on the access decision, the generated license or the denial of license.

21. The apparatus of claim 20, wherein the access information is encrypted.

22. The apparatus of claim 21, wherein the encrypted access information is associated with the compatible format.

23. The apparatus of claim 20, wherein the second uniform resource identifier comprises a uniform resource locator.

24. The apparatus of claim 20, wherein the first uniform resource identifier comprises a uniform resource locator.

25. The apparatus of claim 24, wherein the processor-executable instructions that, when executed by the one or more processors, cause the apparatus to send, to the first service element via the first uniform resource identifier, the request for access rights further cause the apparatus to send the request according to the uniform resource locator.

26. The apparatus of claim 25, wherein the processor-executable instructions that, when executed by the one or more processors, cause the apparatus to send the request according to the uniform resource locator further cause the apparatus to send information relating to a user transmitting the request.

27. The apparatus of claim 20, wherein the access rights comprise a digital rights management license.

28. The apparatus of claim 21, wherein the first service element is a license generation service associated with the compatible format.

29. The apparatus of claim 21, wherein the second service element is a license decision service distinct from the first service element.

30. A non-transitory computer readable medium storing processor-executable instructions that, when executed by at least one processor, cause the at least one processor to:
   receive, via a license generation service of a plurality of license generation services, a request for an access decision associated with content, wherein the license generation service of the plurality of license generation services is associated with a license generation of a particular format, wherein the plurality of license generation services are remotely located from a user device;
   determine, based on a compatibility between the content and the particular format and one or more requirements associated with at least one or more of the content, the user device, or a user associated with the user device, the access decision; and
   send the access decision to the license generation service, wherein the access decision facilitates generating a license by the license generation service when the access decision indicates a granting of access rights, and wherein the access decision facilitates generating a denial of the license by the license generation service when the access decision indicates a denial of access rights.

31. The non-transitory computer readable medium of claim 30, wherein the processor-executable instructions that, when executed by the at least one processor, cause the at least one processor to determine the access decision further cause the at least one processor to determine whether the one or more requirements are satisfied based on timing information associated with the request for the access decision or the content.

32. The non-transitory computer readable medium of claim 30, wherein the processor-executable instructions that, when executed by the at least one processor, cause the at least one processor to determine the access decision further cause the at least one processor to:
   access stored user rights data associated with the user device or the user associated with the user device; and
   determine whether the one or more requirements are satisfied based on one or more permissions indicated in the stored user rights data.

33. The non-transitory computer readable medium of claim 30, wherein the license generation service corresponds to a first classification of content, wherein the content is included in the first classification of content, and the processor-executable instructions, when executed by the at least one processor, further cause the at least one processor to:
   receive, via a second license generation service corresponding to a second classification of content, a second request for an access decision associated with second content included in the second classification of content.

34. The non-transitory computer readable medium of claim 30, wherein the license generation service corresponds to a classification of a plurality of classifications of content.

35. The non-transitory computer readable medium of claim 30, wherein the license generation service corresponds to a content format of a plurality of content formats.

* * * * *